United States Patent
Ratter et al.

(10) Patent No.: US 11,914,836 B2
(45) Date of Patent: *Feb. 27, 2024

(54) HAND PRESENCE OVER KEYBOARD INCLUSIVENESS

(71) Applicant: Meta Platforms Technologies, LLC, Menlo Park, CA (US)

(72) Inventors: Adrian Brian Ratter, Redwood City, CA (US); Alessia Marra, Zurich (CH); Yugeng He, San Francisco, CA (US); Panya Inversin, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,164

(22) Filed: Dec. 20, 2022

(65) Prior Publication Data
US 2023/0131667 A1 Apr. 27, 2023

Related U.S. Application Data

(63) Continuation of application No. 17/073,200, filed on Oct. 16, 2020, now Pat. No. 11,537,258.

(51) Int. Cl.
*G06F 3/04815* (2022.01)
*G02B 27/00* (2006.01)
(Continued)

(52) U.S. Cl.
CPC ..... *G06F 3/04815* (2013.01); *G02B 27/0093* (2013.01); *G02B 27/017* (2013.01);
(Continued)

(58) Field of Classification Search
CPC .............. G02F 1/13338; G02F 1/1343; G02F 1/134309; H04S 2400/01; H04S 2400/11;
(Continued)

(56) References Cited

U.S. PATENT DOCUMENTS

2015/0089444 A1* 3/2015 Paris .................. G06F 3/04845
715/799
2018/0350150 A1* 12/2018 Powderly .............. G06F 3/0219
(Continued)

*Primary Examiner* — Rayeez R Chowdhury
(74) *Attorney, Agent, or Firm* — Potomac Law Group, PLLC; Dannon G. Allbee

(57) ABSTRACT

A method includes accessing an image of a physical environment of a user, the image depicting a physical input device and a physical hand of the user, determining that a contrast between the physical input device and the physical hand depicted in the image is lower than a predetermined threshold, modifying the image to increase the contrast, determining a pose of the physical input device, generating a three-dimensional model representing the physical hand of the user, generating an image mask by projecting the three-dimensional model onto an image plane, generating, a cropped image depicting at least the physical hand of the user in the image, rendering, based on the perspective of the user and the pose of the physical input device, a virtual input device to represent the physical input device, and displaying the cropped image depicting at least the physical hand over the rendered virtual input device.

20 Claims, 11 Drawing Sheets
(3 of 11 Drawing Sheet(s) Filed in Color)

(51) Int. Cl.
  *G02B 27/01* (2006.01)
  *G06T 7/10* (2017.01)
  *G06T 7/70* (2017.01)

(52) U.S. Cl.
  CPC .................. *G06T 7/10* (2017.01); *G06T 7/70* (2017.01); *G06T 2207/20132* (2013.01)

(58) Field of Classification Search
  CPC ...... H04S 2420/01; H04S 3/008; H04S 7/303; H04S 7/304; H04R 5/033; G06V 40/28; G06V 10/143; G06V 10/145; G06V 10/987; G06V 40/12; G06V 40/23; G06F 3/017; G06F 3/0233; G06F 3/04886; G06F 3/0227; G06F 3/0304; G06F 3/03547; G06F 3/04883; G06F 40/166; G06F 1/1626; G06F 1/1632; G06F 1/1673; G06F 16/90344; G06F 18/241; G06F 2203/04808; G06F 3/011; G06F 3/012; G06F 3/013; G06F 3/016; G06F 3/02; G06F 3/0221; G06F 3/023; G06F 3/0237; G06F 3/0346; G06F 3/03545; G06F 3/0416; G06F 3/0418; G06F 3/042; G06F 3/0426; G06F 3/04812; G06F 3/04815; G06F 3/0488; G06F 3/0489; G06F 8/20; G06F 8/33; G06F 8/34; G06F 8/41; G06F 8/456

See application file for complete search history.

(56) References Cited

U.S. PATENT DOCUMENTS

| 2019/0265781 A1* | 8/2019 | Kehoe ................... G06F 3/0304 |
| 2019/0295323 A1* | 9/2019 | Gutierrez ................. G06T 7/70 |
| 2021/0225077 A1* | 7/2021 | Ge ........................ G06V 10/774 |
| 2021/0350564 A1* | 11/2021 | Peuhkurinen ......... G06F 3/0426 |

* cited by examiner

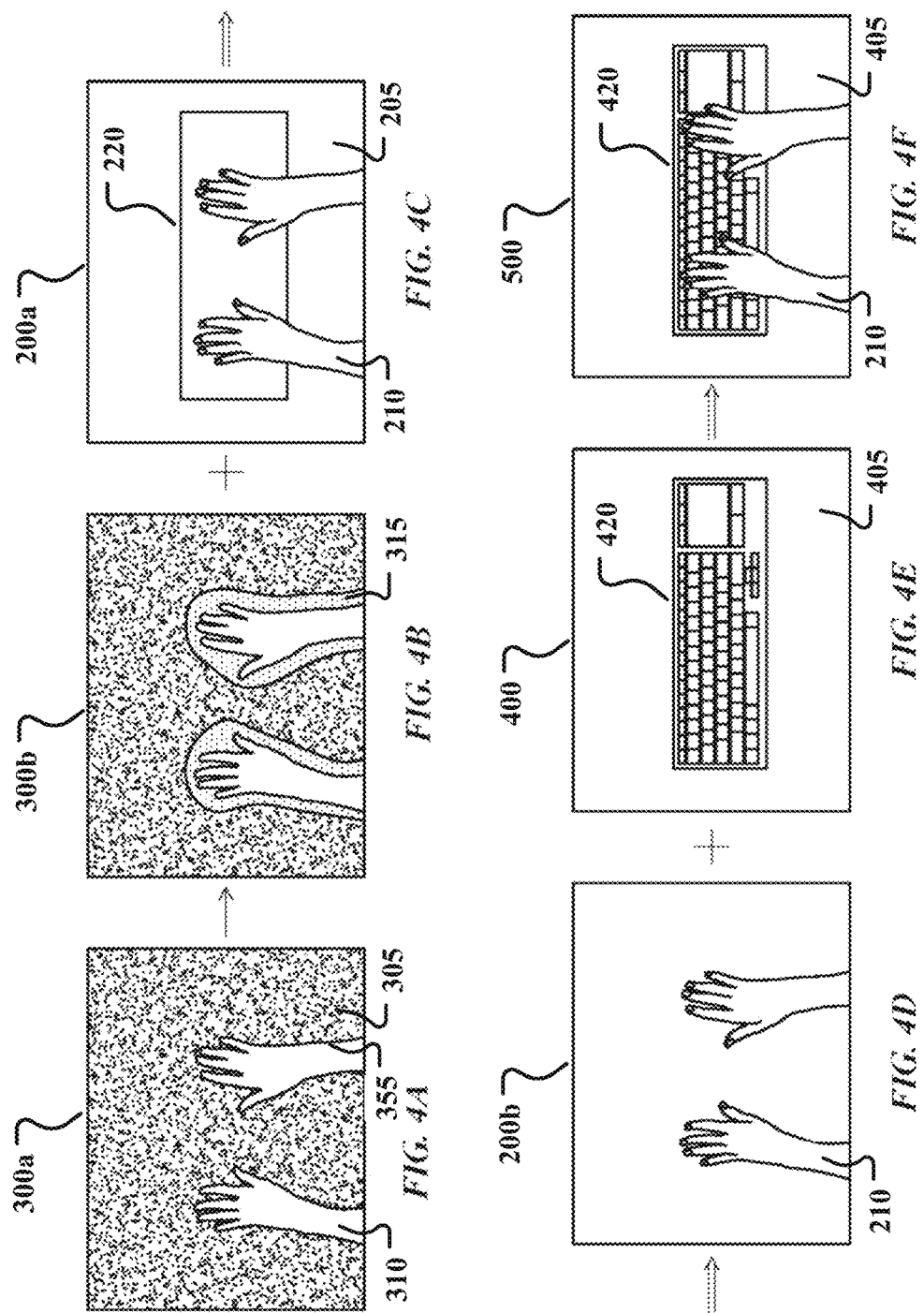

HAND PRESENCE OVER KEYBOARD INCLUSIVENESS

PRIORITY

This application is a continuation under 35 U.S.C. § 120 of U.S. patent application Ser. No. 17/073,200, filed 16 Oct. 2020, which is incorporated herein by reference.

TECHNICAL FIELD

This disclosure generally relates to user interactions with a physical input device in a virtual reality environment.

BACKGROUND

Virtual reality is a computer-generated simulation of an environment (e.g., a 3D environment) that users can interact with in a seemingly real or physical way. Virtual reality content may include completely generated content or generated content combined with captured content (e.g., real-world photographs). The virtual reality content may include video, audio, haptic feedback, and/or other sensations to imitate a real or imaginary environment. Virtual reality systems that provide virtual reality content may be implemented on various platforms, including a head-mounted device (HMD) connected to a host computer system, a standalone HMD, a mobile device or computing system, or any other hardware platform capable of providing virtual reality content to one or more viewers.

Virtual reality may be associated with applications, products, accessories, services, or some combination thereof, that are, e.g., used to create content in virtual reality and/or used in (e.g., perform activities in) virtual reality. Particular applications of virtual reality may involve and/or benefit from the use of a physical input device (e.g., a physical keyboard) in the context of work, entertainment, games, and various additional forms of interactive content.

SUMMARY OF PARTICULAR EMBODIMENTS

Virtual reality is a form of reality that has been adjusted in some manner before presentation to a user. Virtual reality content may include completely generated content or generated content combined with captured content (e.g., real-world photographs). The virtual reality content may include video, audio, haptic feedback, or some combination thereof, and any of which may be presented in a single channel or in multiple channels (such as stereo video that produces a three-dimensional effect to the viewer). Additionally, in some embodiments, virtual reality systems may be associated with applications, products, accessories, services, or some combination thereof, that are, e.g., used to create content in a virtual reality environment and/or used in (e.g., perform activities in) a virtual reality environment.

Virtual reality systems that provide virtual reality content may be implemented on various platforms, including a head-mounted device (HMD) connected to a host computer system, a standalone HMD, a mobile device or computing system, or any other hardware platform capable of providing virtual reality content to one or more viewers. An HMD may be worn on the user's head and may cover the user's eyes such that the user's vision of the surrounding physical environment may be occluded by the physical structure of the HMD. For example, the displays of the HMD could be positioned directly in front of and in close proximity to the user's eyes. Since the HMD may be the exclusive provider of visual information to the user through internal displays of the HMD, a "passthrough" feature may be used to provide the user with real-time visual information that allows them to see their physical surroundings while wearing the HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if he were to shift away from where the images were taken. Incorrect parallax, coupled with user motion, could lead to motion sickness. Thus, to generate correct parallax, particular embodiments of the passthrough feature extract information about the environment from the captured images (e.g., depth information), use the information to generate a 3D model (a geometric scene representation) of the environment, and reconstruct a scene of the modeled environment from the user's current viewpoint. Additional information related to the passthrough feature can be found in U.S. patent application Ser. No. 16/746,128, filed 17 Jan. 2020, which is incorporated by reference.

Embodiments described herein relate to a process for displaying an image of a user's hand with a virtual representation of a physical input device in a virtual reality environment. In particular embodiments, a virtual reality system may access an image of a physical environment of a user. The image of the physical environment may be associated with a perspective of the user and may depict a physical input device (e.g., a physical keyboard) and a physical hand of the user. The virtual reality system may then determine a pose of the physical input device. In particular embodiments, the virtual reality system may generate a three-dimensional model representing the physical hand of the user, and then generate an image mask by projecting the three-dimensional model onto an image plane associated with the perspective of the user. The virtual reality system may then generate a cropped image depicting at least the physical hand of the user in the image by applying the generated image mask to the image of the physical environment of the user. In particular embodiments, the virtual reality system may render a virtual input device representing the physical input device based on the perspective of the user and the pose of the physical input device. The virtual reality system may then display the cropped image depicting at least the physical hand over the rendered virtual input device.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4F illustrate an example progression for displaying an image of a user's hand in a rendered virtual environment.

DESCRIPTION OF EXAMPLE EMBODIMENTS

Figure 1:
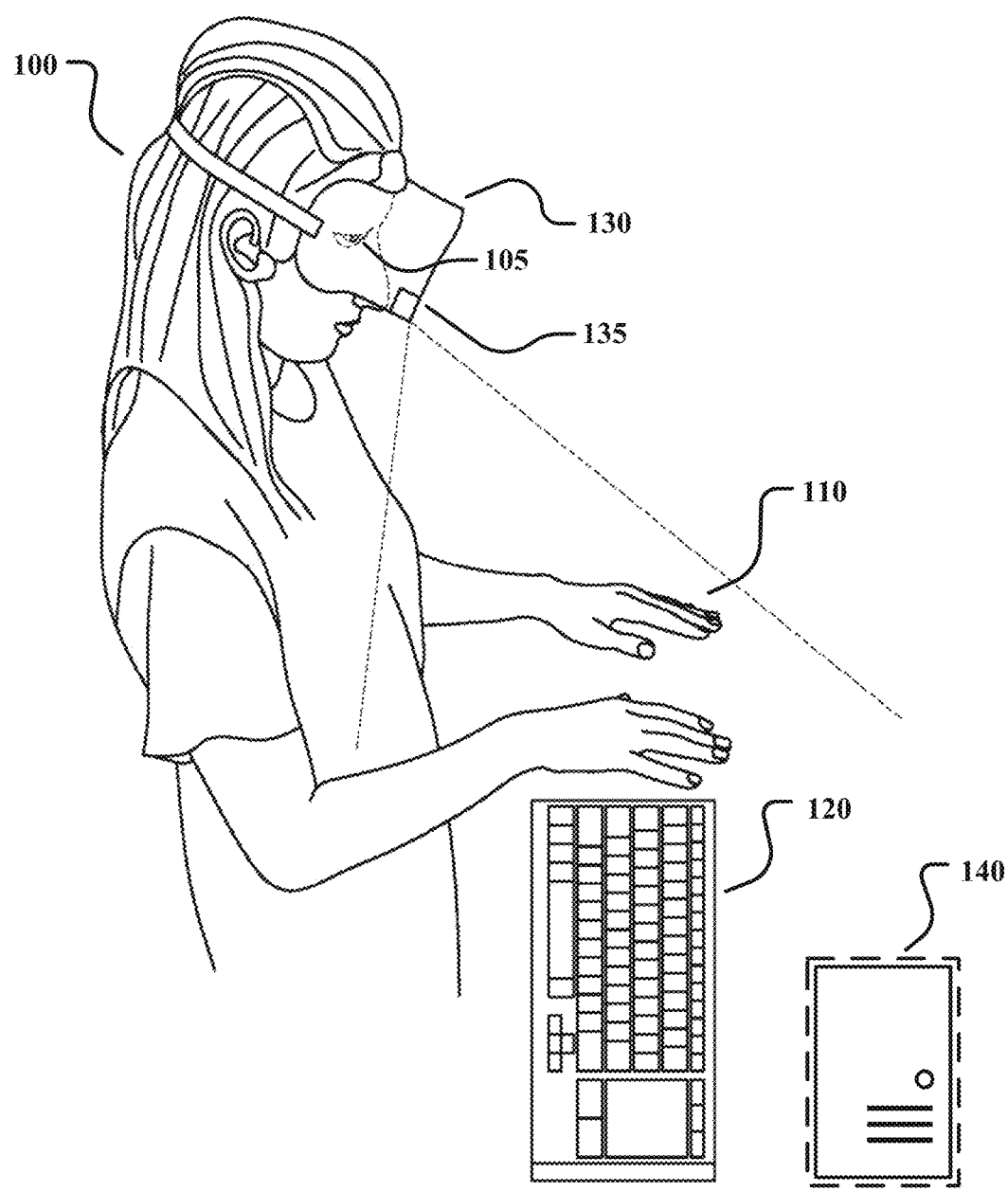
FIG. 1 illustrates an example of a user interacting with a virtual reality system.

Particular applications of virtual reality may involve and/or benefit from the use of a physical input device (e.g., a physical keyboard) in the context of work, entertainment, games, and various additional forms of interactive content. For example, a user utilizing a virtual reality system to work remotely may need to use a physical keyboard to type a document in a virtual reality environment. Although this disclosure describes embodiments of this invention relating to particular user interactions with particular physical input devices, this disclosure contemplates embodiments of this invention relating to any suitable user interactions with any suitable physical input devices.

In conventional keyboard usage, to type accurately and efficiently, users often rely on the ability to see, in real-time, the location of keys on the physical keyboard and the location of their hands and fingers above the keyboard. Users may further rely on the labels shown on the physical keyboard that identify which character or function is associated with each key. Even for users who can type effectively without continuously observing their hands and the keyboard (i.e., touch-typists), visually observing the initial positioning of their hands relative to the keyboard may be helpful or necessary. Thus, to enable users to type with a physical keyboard in a virtual reality environment where the user cannot see the physical keyboard they are interacting with, virtual reality systems must display a depiction of the user's hands relative to a virtual keyboard representing the physical keyboard to the user in the virtual reality environment.

Existing implementations for virtual reality typing with a physical keyboard typically render a virtual keyboard representing the physical keyboard together with 3D hand models representing the shape and relative location of a user's hands. However, since many head-mounted displays (HMD) utilize low-resolution, wide-angle, black-and-white lenses, the available visual information is often noisy and lacks any significant information about depth or color. Consequently, virtual hands generated from that information do not accurately represent the actual form or relative location of the user's hands. As such, users are not provided with sufficiently precise visual feedback and locational awareness of their hands' shape, relative location, and real-time interactions with the physical keyboard, thereby resulting in undesirable typographic mistakes, diminished typing efficiency, and an unpleasant typing experience. As an example, existing virtual reality typing implementations may render a 3D hand model with a positional inaccuracy (e.g., a positional displacement of 0.5 centimeters) resulting in a disconcerting typing experience. As another example, when the positional inaccuracy is greater than the distance between individual keys on the keyboard, it may be effectively impossible for users to type at all. An additional challenge is the lack of adequate depth information and the limited processing resources of a typical HMD, which makes it impractical and prohibitively expensive to implement specialized hand-tracking techniques to fit, in real-time, a full 3D hand model to a noisy image of a user's hands. In view of these challenges, there is a need to provide users with a more effective typing experience in virtual reality environments by displaying a positionally accurate depiction of their hands relative to a physical keyboard. Embodiments described herein cover systems, methods, and media for displaying, to users in a virtual reality environment in which the user cannot see a physical keyboard they are interacting with, accurately positioned, high-resolution, real-time images of the user's hands relative to a virtual keyboard representing the physical keyboard.

FIG. 1 illustrates an example of a user 100 interacting with a virtual reality system. The virtual reality system may comprise a physical input device 120, a head-mounted display (HMD) 130, and one or more computing devices 140. In particular embodiments, physical input device 120 may be a conventional keyboard comprising a plurality of buttons that may be actuated by the hands 110 of user 100. Physical input device 120, HMD 130, and computing device 140 may be communicatively connected by any suitable means of communication between electronic devices. In particular embodiments, computing device 140 may be external and separate from HMD 130, or may instead be integrated within HMD 130.

In particular embodiments, HMD 130 may be worn over the eyes of user 100 and may provide visual content to user 100 through one or more internal displays (not shown) of HMD 130. HMD 130 may completely cover the field of view of user 100 such that the internal displays of the HMD 130 may be the exclusive source of visual information for user 100, thereby providing an immersive virtual-reality experience. One consequence of this, however, is that the user 100 would be unable to see the physical environment surrounding them. In particular, user 100 would be unable to see either their hands 110 or the physical input device 120. As discussed above, without any visual information for the physical input device 120 and the user's hands 110, it may be difficult or impossible for user 100 to effectively interact with physical input device 120. Thus, there is a need for HMD 130 to provide user 100 with real-time visual information for the physical input device 120 and the hands 110 through the internal displays of HMD 130.

In particular embodiments, HMD 130 may comprise one or more external-facing cameras 135 for capturing information about the physical environment around user 100. The one or more external-facing cameras 135 may utilize low-resolution, wide-angle, black-and-white lenses, which may capture noisy images that lack any significant information about depth or color. One or more of the external-facing cameras 135 may be forward-facing cameras positioned to capture the physical input device 120 and the user's hands 110 when user 100 is interacting with physical input device 120. However, as discussed above, displaying the images captured by external-facing cameras 135 to user 100 would not provide an accurate view of the physical environment since the external-facing cameras 135 are not physically located at the exact same location as the eyes of user 100.

Physical input device 120 may be configured to receive input from user 100 through physical interactions between user 100 and physical input device 120. As an example and not by way of limitation, user 100 may physically interact with one or more buttons, touchpads, or sensors associated with physical input device 120. In particular embodiments, physical input device 120 may be configured to communicate the input received from user 100 to computing device 140, which may process the communicated user input, and instruct HMD 130 to display virtual reality content responsive to the user input.

Figure 2A:
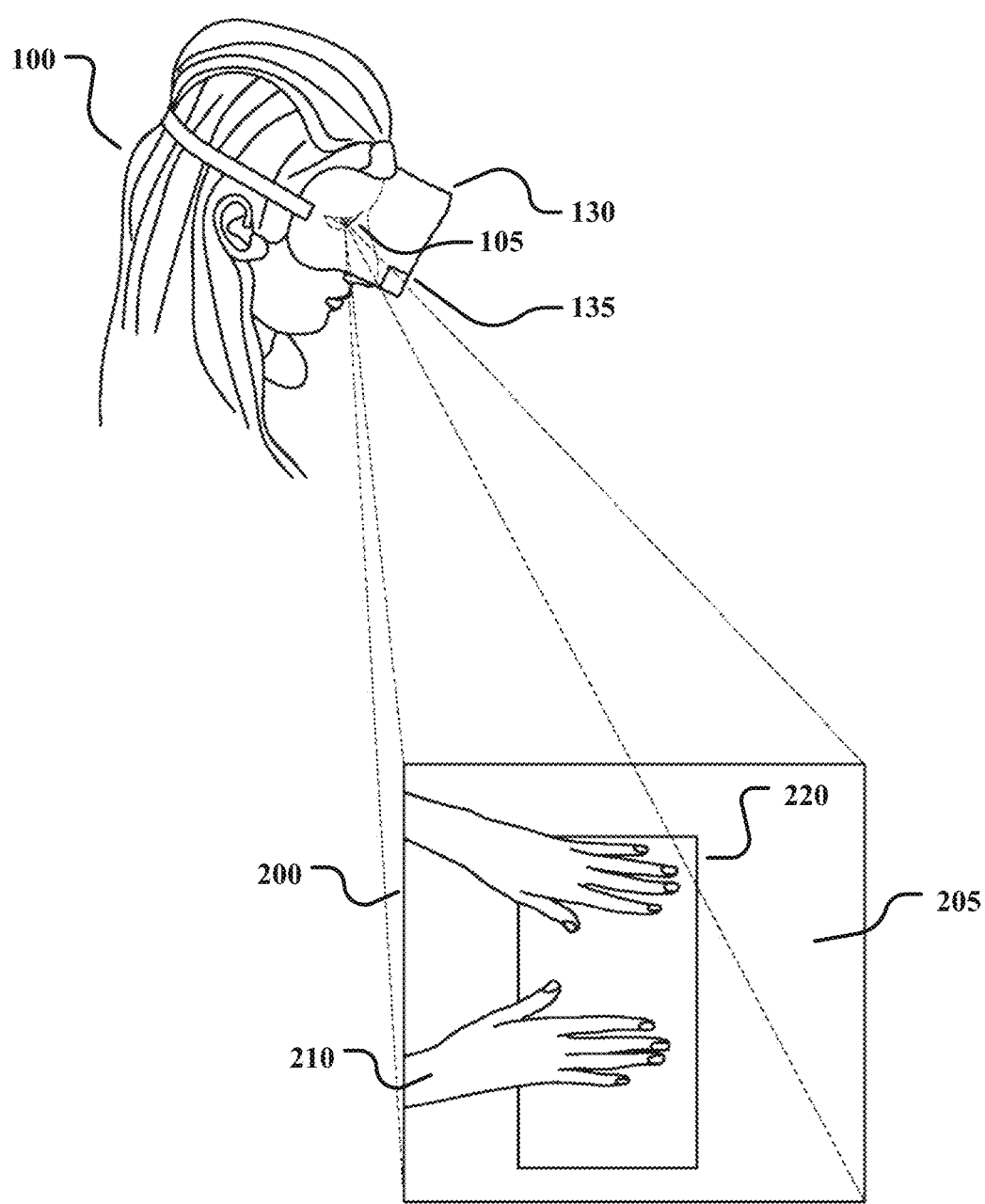
FIGS. 2A & 2B illustrate examples of a passthrough image generated by a virtual reality system.
Figure 2B:

FIGS. 2A & 2B illustrate examples of a passthrough image generated by a virtual reality system. In particular embodiments, the virtual reality system may access a passthrough image 200 depicting the physical environment of user 100 from the perspective of user 100. As shown in FIG. 2A, passthrough image 200 may depict at least the physical input device 120 and the user's hands 110 from the perspective of user 100. In particular embodiments, the passthrough feature described above may be used to generate passthrough image 200 by projecting image data captured from the perspectives of external-facing cameras 135 onto an image plane associated with a perspective of user 100. Additional information related to the passthrough feature can be found in U.S. patent application Ser. No. 16/746,128, filed 17 Jan. 2020, which is incorporated by reference.

FIG. 2B shows an example passthrough image 200 in which a user's hands 210a and 210b are interacting with physical keyboard 220. As can be observed in FIG. 2B, example passthrough image 200 depicts the physical environment of the user from an accurate perspective of the eyes of user 100. However, due to the noise and low-resolution of the external-facing cameras 135, particular visual details within a passthrough image 200 may be distorted or indiscernible. As a result, if the virtual reality system displayed the example passthrough image 200 in FIG. 2B to user 100 using the internal displays of HMD 130, it may be difficult or impossible for user 100 to visually distinguish the separation between the keyboard buttons or read the key labels identifying each button. Consequently, it would be difficult for user 100 to know which button is closest to (or in contact with) the user's finger without being able to clearly see the boundaries or labels of each button. Thus, while passthrough image 200 may provide a positionally accurate perspective of physical surroundings of user 100, the limited discernable visual details related to physical input device 120 in passthrough image 200 may not adequately enable effective physical interaction with physical input device 120.

Figure 3:
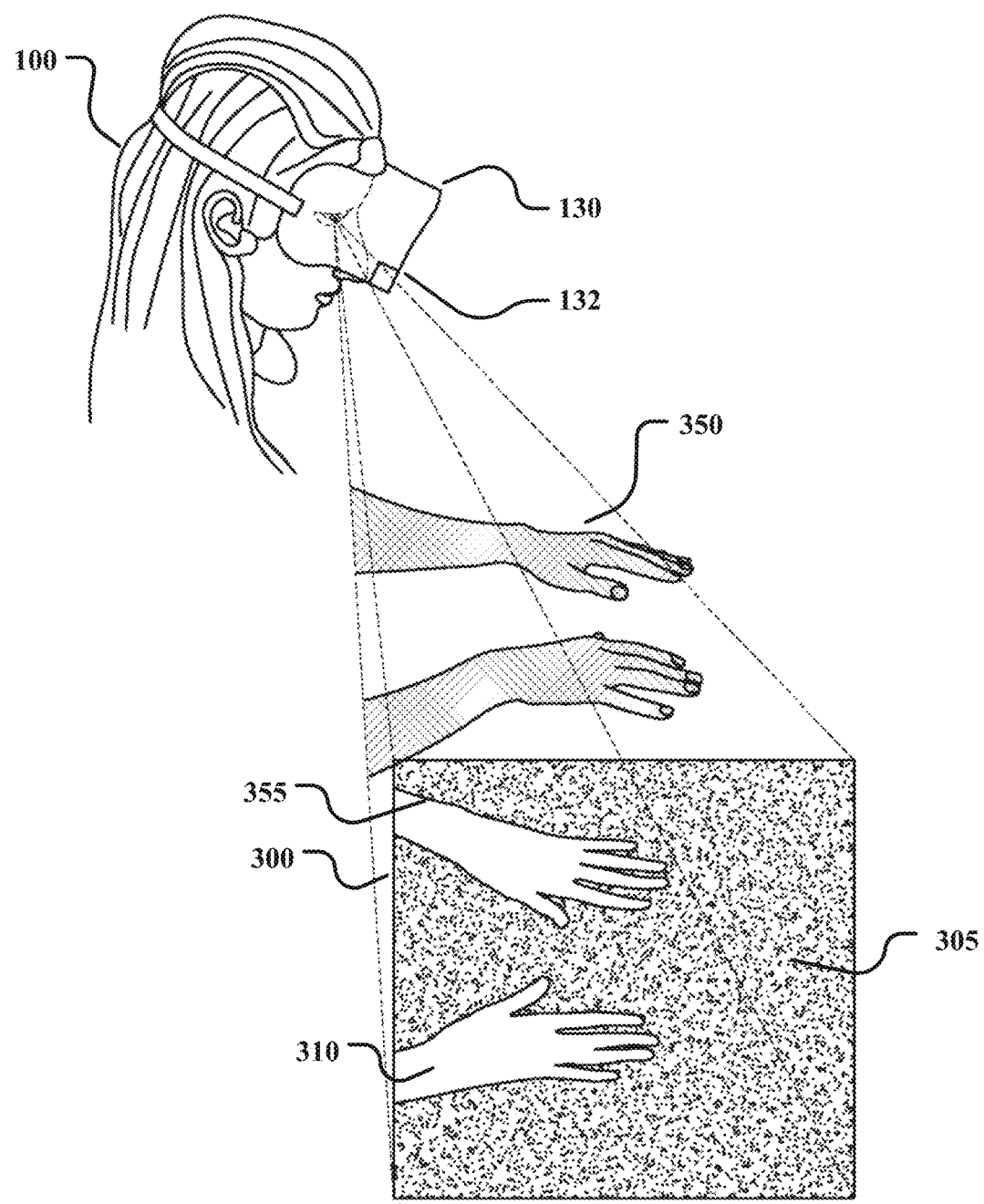
FIG. 3 illustrates an example of an image mask generated by a virtual reality system.

FIG. 3 illustrates an example image mask 300 generated by a virtual reality system. Image mask 300 may be generated for use in cropping the passthrough image 200 depicting the physical environment of user 100 from the perspective of user 100 as described above. To generate image mask 300, the virtual reality system may first access visual information associated with the hands 110 of user 100 captured by external-facing cameras 135. The virtual reality system may then use the visual information associated with the user's hands 110 to generate a three-dimensional model 350 of the user's hands 110 using any suitable three-dimensional modelling technique. As an example and not by way of limitation, the three-dimensional hand model 350 may be generated by detecting key points on the user's hands 110, and then using the detected key points to morph a generic three-dimensional hand model into the three-dimensional hand model 350 approximating the size and position of the user's hands 110.

In particular embodiments, the virtual reality system may project the three-dimensional hand model 350 from the perspective of user 100 hand onto an image plane corresponding to the plane of passthrough image 200 from the perspective of user 100. The virtual reality system may then identify a contour 355 of the projected three-dimensional hand model 350 within the image plane. In particular embodiments, the virtual reality system may generate an image mask 300 comprising a plurality of pixels by storing, for each pixel, an assigned alpha value indicating a measure of transparency. In particular, each pixel in image mask 300 may be assigned an alpha value based on its location within the image mask 300 relative to the identified contour 355 of projected three-dimensional hand model 350 such that pixels 305 located external to a contour 355 may be assigned a low or zero transparency value, while pixels 310 located within contour 355 may be assigned a high transparency value. In particular embodiments, the resulting image mask 300 may be applied to a passthrough image 200 to generate a cropped passthrough image as described below.

FIGS. 4A-4F illustrate an example progression for displaying an image of a user's hand in a rendered virtual environment. In FIG. 4A, an image mask 300a may be generated in the manner described above with respect to FIG. 3. Image mask 300a may comprise a plurality of pixels 305 located external to a contour 355 of a projection of three-dimensional hand model 350 and a plurality of pixels 310 located within contour 355. External pixels 305 may be assigned alpha values with a low or zero transparency value, while internal pixels 310 may be assigned alpha values with a high transparency value.

In particular embodiments, the contour 355 in image mask 300a may not exactly line up with the user's hands 210 in passthrough image 200 due to the challenges of implementing existing three-dimensional hand modeling techniques in virtual reality systems as discussed above. Specifically, since the three-dimensional hand model 350 is unlikely to reflect the exact shape and location of the user's hands, applying image mask 300a to passthrough image 200 may inadvertently crop out portions of the user's hands 210. As shown in FIG. 4B, particular embodiments may resolve this issue by modifying image mask 300a to include a plurality of buffer region pixels 315 adjacent to contour 355. In particular, buffer region 315 may be created by identifying a plurality of external pixels 305 closest to contour 355 and adjusting the assigned alpha values of those pixels to have increased transparency values. In particular embodiments, alpha-blending techniques may be used to adjust buffer region 315 to have a range of alpha values with varying transparency values based on the pixel location within buffer region 315. For example, the alpha values of buffer region 315 may be adjusted such that transparency values may be high for pixels near contour 355, but may gradually decrease for pixels based on the distance from contour 355.

FIG. 4C illustrates an example passthrough image 200a as discussed above with respect to FIGS. 2A and 2B. In particular embodiments, one or more adjustments may be made to passthrough image 200a before image mask 300 is applied to passthrough image 200a to generate a cropped passthrough image 200b.

In particular embodiments, virtual reality systems may be utilized by users having a wide range of skin tones, and because physical input devices are made in a variety of different colors, the contrast between a user's hand 210 and a physical input device 220 displayed in a passthrough image 200 may vary. The example passthrough image 200 in FIG. 2B shows an example of how the level of contrast between a user's hand 210 and a keyboard 220 may affect the degree to which visual details can be recognized for both the user's hand 210 and the keyboard 220. For example, the user's hand 210a has a light skin tone which provides significant contrast against the black keyboard 220, while the user's hand 210b having a dark skin tone (emulated using a glove made of a dark-colored material) provides very little contrast against the black keyboard 220. As can be observed in the example passthrough image 200 in FIG. 2B, it is relatively more difficult to discern visual details (e.g., the contours of the user's hands) for the user's hand 210b which has a lower contrast against the keyboard 220 than it is to discern the same visual details for the user's hand 210a which has a higher contrast against the keyboard 220. This relative difference may be due at least in part to the low-resolution, black-and-white cameras that were used to generate passthrough image 200.

To address this issue, prior to application of image mask 300b, the passthrough image 200a in FIG. 4C may be adjusted by using image processing techniques to raise the contrast between the shade of the user's hand 210 and the shade of the keyboard 220. In particular embodiments, this may be accomplished by first using statistical sampling techniques to sample pixel shade values in an area of pixels known to be associated with the user's hand 210 (e.g., pixels within a set distance from a joint of the user's hand) and an area of pixels known to be associated with the keyboard 220 (e.g., keyboard pixels away from the hand's location) in order to generate shading predictions for both the user's hand 210 and the keyboard 220. The shading predictions are then used to identify and separate a larger set of pixels associated with the user's hand 210 from a larger set of pixels associated with the keyboard 220. Once separated, values associated with shading and/or intensity may be adjusted for any of the sets of pixels in order to raise the contrast between the sets of pixels in passthrough image 200a.

In particular embodiments, the sampled pixel shade values associated with the keyboard 220 in passthrough image 220a may be compared to shading values of a virtual keyboard 420 representing the physical keyboard 120. If it is determined that the sampled pixel shade values associated with keyboard 220 do not match the shading values of virtual keyboard 420, one or more of the pixels in the larger set of identified pixels associated with the keyboard 220 may be adjusted to be consistent with the shading values of virtual keyboard 420.

In particular embodiments, additional adjustments may be made to passthrough image 200a before image mask 300 is applied to passthrough image 200a to generate the cropped passthrough image 200b. For example, one or more substantially dark pixels detected in passthrough image 200a may be determined to be associated with a shadow caused by the user's hands 210 or by another object in the physical surroundings of user 100. By adjusting values associated with shading and/or intensity for one or more of the dark pixels associated with a shadow, the dark pixels may be less noticeable to user 100 once the cropped passthrough image 200b is subsequently displayed in the virtual reality environment as described below in association with FIG. 4F.

FIG. 4D illustrates an example cropped passthrough image 200b resulting from application of the modified image mask 300b to the passthrough image 200a. In particular, when applied to passthrough image 200a, the low or zero transparency values of the external pixels 305 of image mask 300 may effectively crop out the corresponding pixels in passthrough image 200a. Due to the buffer zone 315 added in modified image mask 300b, cropped passthrough image 300b may retain most, if not all, of the pixels associated with the user's hand 210 corresponding pixels in the passthrough image 200a, but may also retain any additional pixels near the user's hands 210 in passthrough image 200a which correspond to pixels in the buffer zone 315. As a result of the high transparency values of the internal pixels 310 and the alpha-blended values of the buffer zone 315 in modified image mask 300b, cropped passthrough image 300b may result in minimal changes to the alpha values of the user's hands 210, particularly for pixels further from the boundary of the user's hand 210, but may appear to fade along the edges of the user's hand 210. The fading effect may serve to diminish the visual impact of any excess passthrough pixels that did not get cropped out by modified image mask 300b.

FIG. 4E illustrates an example rendering of a virtual keyboard 420 representing the physical keyboard 120 in a virtual reality environment 400. In particular, a pose of the physical keyboard 120 may be determined based at least in part on image data captured by the one or more external-facing cameras 132. As an example and not by way of limitation, the pose of the physical keyboard 120 may be determined using any suitable object tracking technique (e.g., point tracking, silhouette tracking, etc.). The virtual reality system may then access a virtual keyboard model 420 corresponding to physical keyboard 120 such that the layout and graphical representation of virtual keyboard model 420 corresponds to the layout and visual appearance of physical keyboard 120. The virtual keyboard 420 may then be rendered in the virtual reality environment displayed to user 100 by the internal-facing displays of HMD 130.

FIG. 4F illustrates an example display of cropped passthrough image 200b over the rendering of virtual keyboard 420 in a virtual reality environment 500. In particular, the user's hands 210 in cropped passthrough image 200b may partially or completely obstruct a portion of the virtual keyboard 420. As discussed above, portions of physical keyboard 220 adjacent to the user's hands 210 in passthrough image 200a may have remained in cropped passthrough image 200b due to the buffer zone 315 added in image mask 300b. However, any portions of keyboard 220 displayed over virtual keyboard 420 may be less noticeable to user 100 due to one or more of the adjustments mentioned above. For example, the alpha blending of transparency values in the buffer zone 315 of image mask 300b may cause the display of cropped passthrough image 200b to appear increasingly transparent towards the periphery of the displayed image, thereby creating a smoother visual transition where any portion of the physical keyboard 220 is overlaid with virtual keyboard 420. As another example, adjustments to the shading values of physical keyboard 220 in passthrough image 200a may cause any portions of physical keyboard 220 that remained in cropped passthrough image 200b to visually match the shading values of virtual keyboard 420, thereby reducing any noticeable distinction between the remaining portions of physical keyboard 220 and virtual keyboard 420.

Figure 5A:
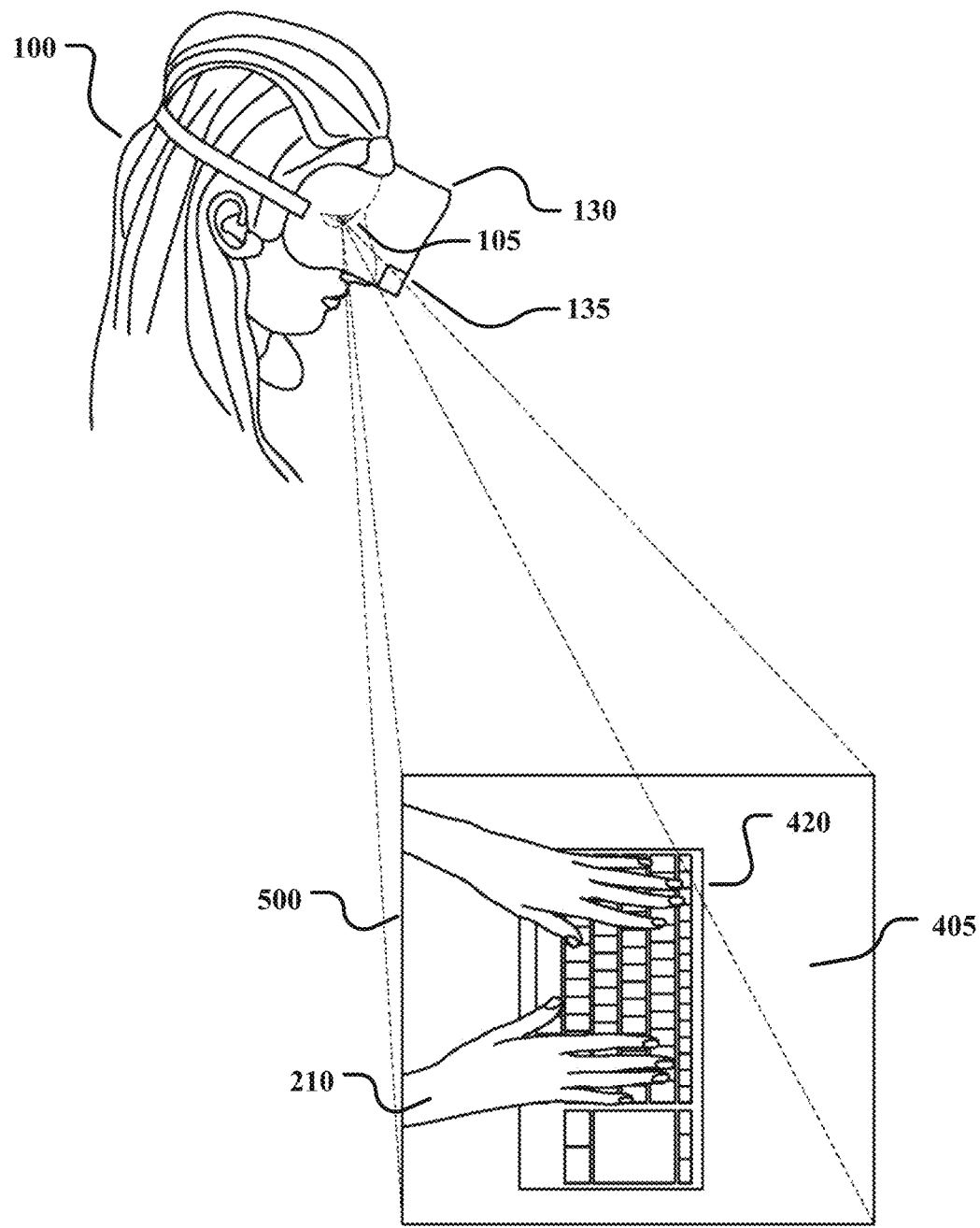
FIGS. 5A-5C illustrate examples of a user's hand displayed in a rendered virtual environment.
Figure 5B:
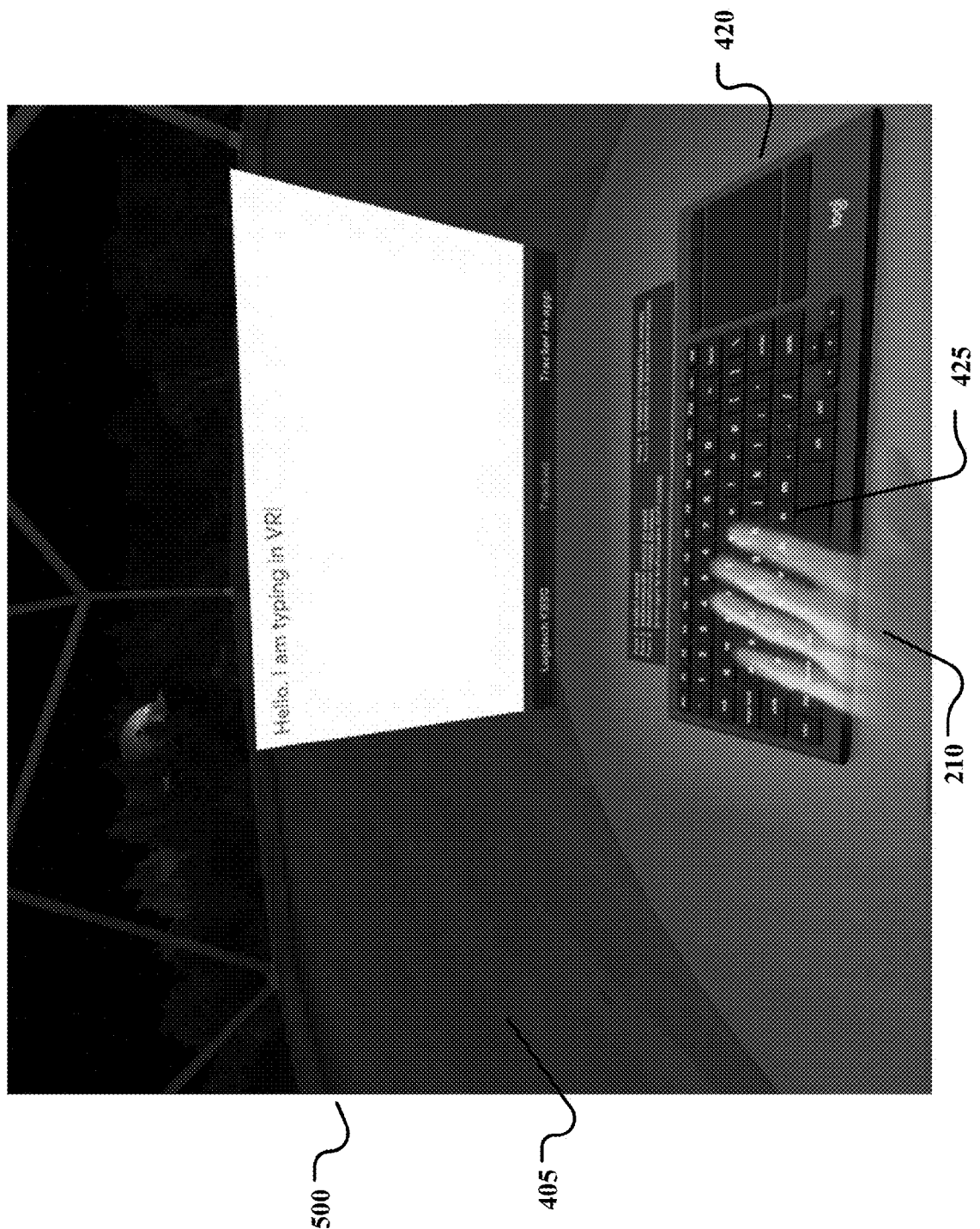
Figure 5C:
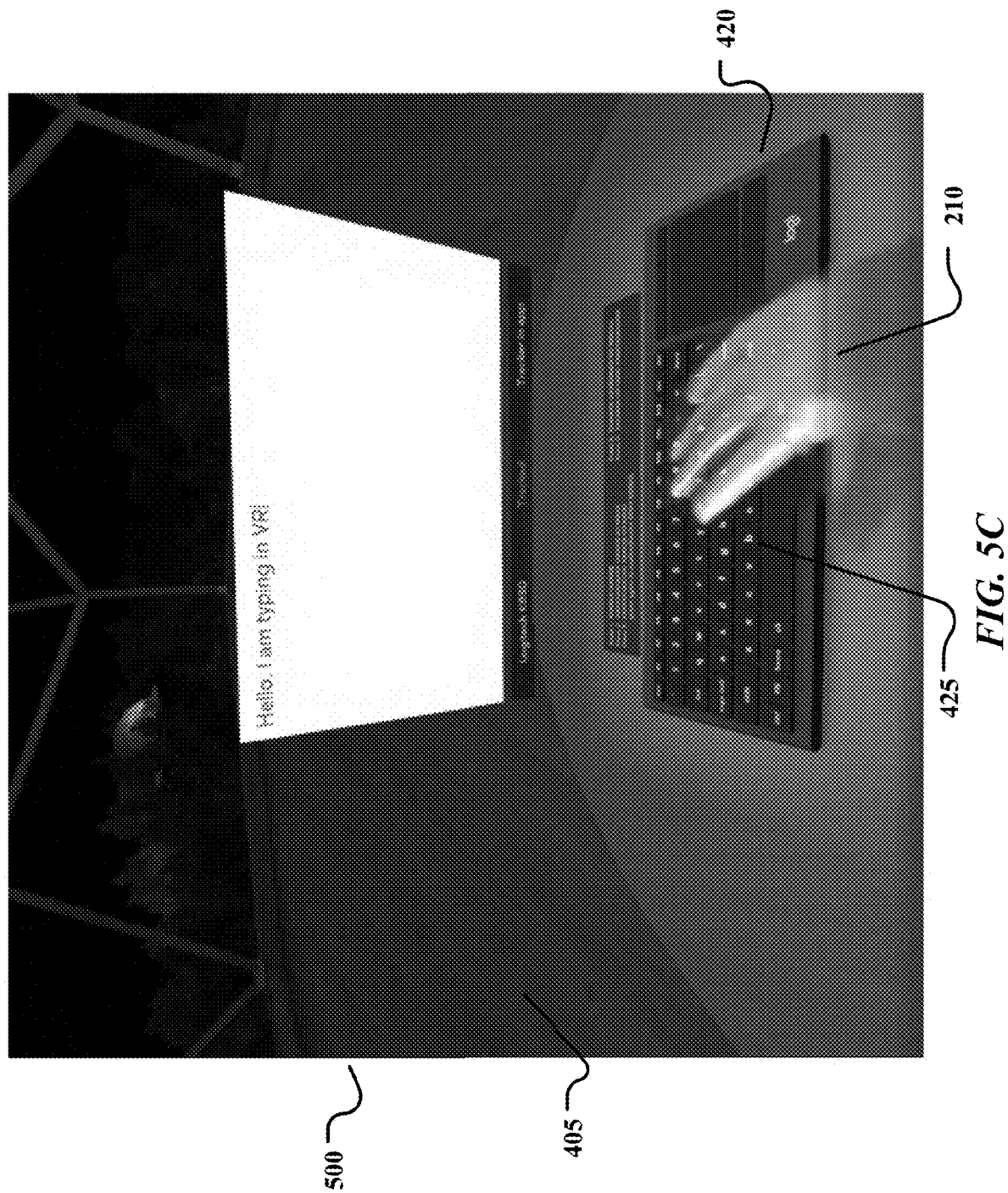

FIGS. 5A-5C illustrate examples of a user's hands 210 displayed over a rendered virtual keyboard 420 in a virtual reality environment 500 in accordance with the methods described above. In particular embodiments, additional adjustments may be made to the cropped passthrough image 200b or the virtual reality environment 500 to ensure that user 100 can visually identify virtual keys labels 425 of virtual keyboard 420 matching the physical key labels printed on physical keyboard 120. As an example, virtual key labels 425 may be rendered in their appropriate positions directly over the cropped passthrough image 200b such that all of the virtual key labels 425 may be clearly visible to user 100 regardless of the positioning and transparency values of cropped passthrough image 200b. In an alternative example, virtual keys labels 425 may be rendered together with virtual keyboard 420, and one or more transparency values associated with cropped passthrough image 200b may be adjusted such that the virtual key labels 425 are sufficiently visible through the cropped passthrough image 200b, as can be observed in the example virtual reality environments 500 shown in FIGS. 5B and 5C. The adjustments to the transparency values associated with cropped passthrough image 200b may be adjusted in any suitable method, including but not limited to, adjusting the transparency values of the relevant pixels in image mask 300 before it is applied to passthrough image 200a, or by adjusting transparency values of cropped passthrough image 200b when displaying it over virtual keyboard 420 in virtual reality environment 500. In particular embodiments, adjustments to the transparency values associated with cropped passthrough image 200b may be further adjusted such that cropped passthrough image 200b appears to fade out based on proximity to virtual keyboard 420 or based on proximity to one or more bounding boxes associated with virtual keyboard 420.

Figure 6:
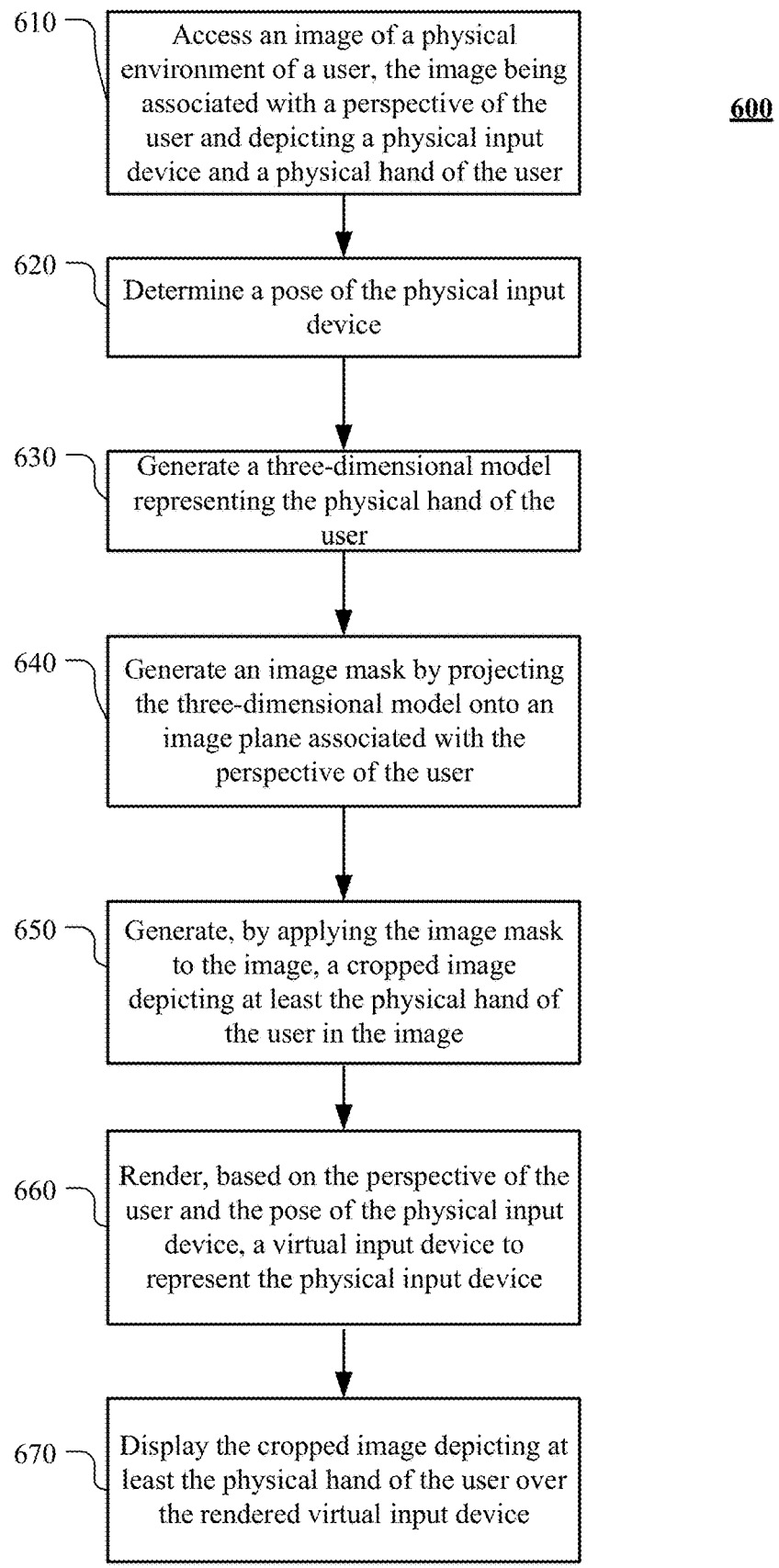
FIG. 6 illustrates an example method for displaying an image of a user's hand in a rendered virtual environment.

FIG. 6 illustrates an example method 600 for displaying a user's hand in a rendered virtual environment. The method may begin at step 610, where a computing system may access an image of a physical environment of a user, the image being associated with a perspective of the user and depicting a physical input device and a physical hand of the user. At step 620, the computing system may determine a pose of the physical input device. At step 630, the computing system may generate a three-dimensional model representing the physical hand of the user. At step 640, generate an image mask by projecting the three-dimensional model onto an image plane associated with the perspective of the user. At step 650, the computing system may generate, by applying the image mask to the image, a cropped image depicting at least the physical hand of the user in the image. At step 660, the computing system may render, based on the perspective of the user and the pose of the physical input device, a virtual input device to represent the physical input device. At step 670, the computing system may display the cropped image depicting at least the physical hand of the user over the rendered virtual input device. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for implementing a transfer learning process, including the particular steps of the method of FIG. 6, this disclosure contemplates any suitable method of implementing a transfer learning process, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
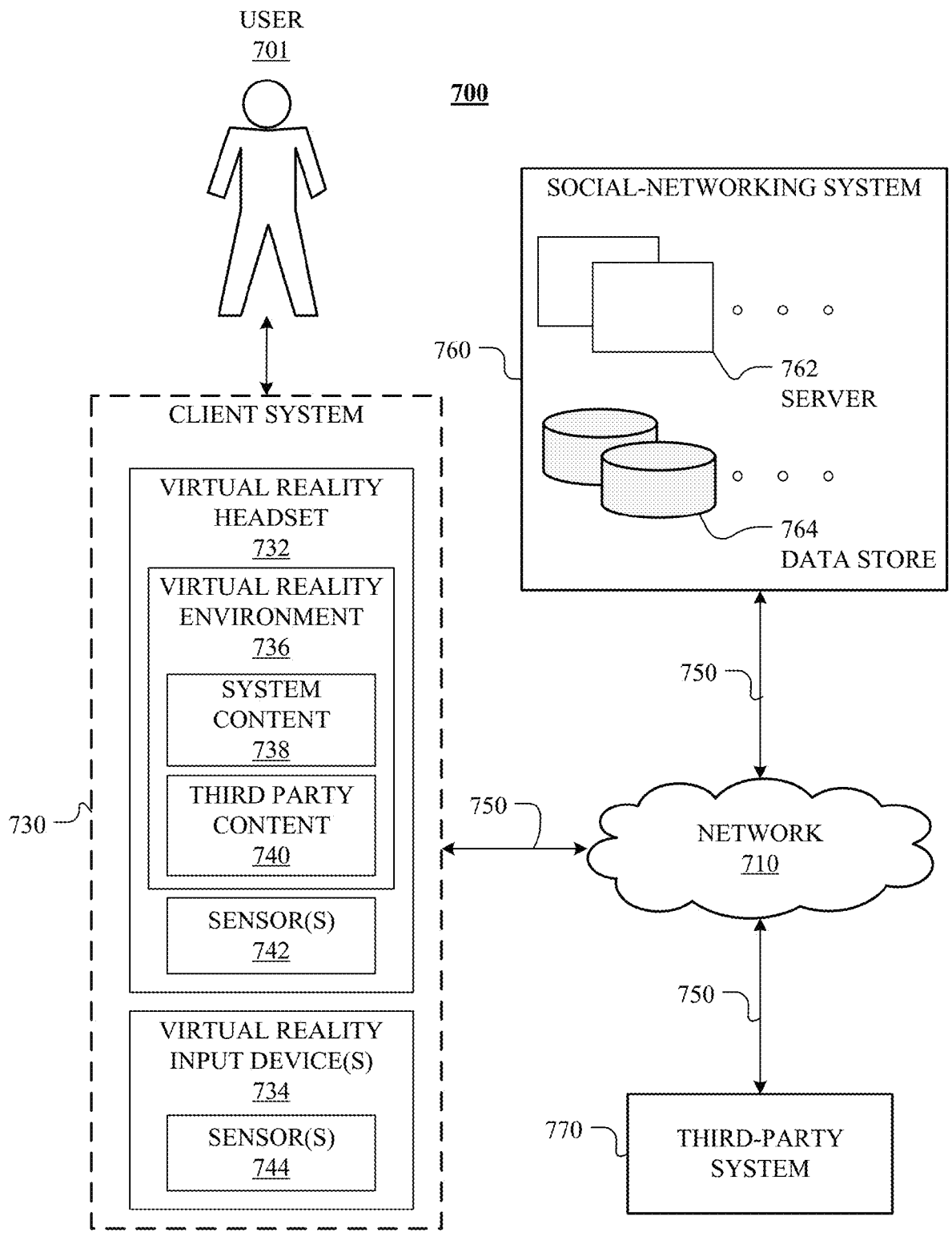
FIG. 7 illustrates an example network environment associated with a virtual reality system.

FIG. 7 illustrates an example network environment 700 associated with a virtual reality system. Network environment 700 includes a user 701 interacting with a client system 730, a social-networking system 760, and a third-party system 770 connected to each other by a network 710. Although FIG. 7 illustrates a particular arrangement of a user 701, a client system 730, a social-networking system 760, a third-party system 770, and a network 710, this disclosure contemplates any suitable arrangement of a user 701, a client system 730, a social-networking system 760, a third-party system 770, and a network 710. As an example and not by way of limitation, two or more of a user 701, a client system 730, a social-networking system 760, and a third-party system 770 may be connected to each other directly, bypassing a network 710. As another example, two or more of a client system 730, a social-networking system 760, and a third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple users 701, client systems 730, social-networking systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 710 may include one or more networks 710.

Links 750 may connect a client system 730, a social-networking system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be an electronic device including hardware, software, or embedded logic components or a combination of two or more such components and capable of carrying out the appropriate functionalities implemented or supported by a client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 730. A client system 730 may enable a network user at a client system 730 to access a network 710. A client system 730 may enable its user to communicate with other users at other client systems 730. A client system 730 may generate a virtual reality environment for a user to interact with content.

In particular embodiments, a client system 730 may include a virtual reality (or augmented reality) headset 732, such as OCULUS RIFT and the like, and virtual reality input device(s) 734, such as a virtual reality controller. A user at a client system 730 may wear the virtual reality headset 732 and use the virtual reality input device(s) to interact with a virtual reality environment 736 generated by the virtual reality headset 732. Although not shown, a client system 730 may also include a separate processing computer and/or any other component of a virtual reality system. A virtual reality headset 732 may generate a virtual reality environment 736, which may include system content 738 (including but not limited to the operating system), such as software or firmware updates and also include third-party content 740, such as content from applications or dynamically downloaded from the Internet (e.g., web page content). A virtual reality headset 732 may include sensor(s) 742, such as accelerometers, gyroscopes, magnetometers to generate sensor data that tracks the location of the headset device 732. The headset 732 may also include eye trackers for tracking the position of the user's eyes or their viewing directions. The client system may use data from the sensor(s) 742 to determine velocity, orientation, and gravitation forces with respect to the headset. Virtual reality input device(s) 734 may include sensor(s) 744, such as accelerometers, gyroscopes, magnetometers, and touch sensors to generate sensor data that tracks the location of the input device 734 and the positions of the user's fingers. The client system 730 may make use of outside-in tracking, in which a tracking camera (not shown) is placed external to the virtual reality headset 732 and within the line of sight of the virtual reality headset 732. In outside-in tracking, the tracking camera may track the location of the virtual reality headset 732 (e.g., by tracking one or more infrared LED markers on the virtual reality headset 732). Alternatively or additionally, the client system 730 may make use of inside-out tracking, in which a tracking camera (not shown) may be placed on or within the virtual reality headset 732 itself. In inside-out tracking, the tracking camera may capture images around it in the real world and may use the changing perspectives of the real world to determine its own position in space.

Third-party content 740 may include a web browser, and may have one or more add-ons, plug-ins, or other extensions, such as TOOLBAR or YAHOO TOOLBAR. A user at a client system 730 may enter a Uniform Resource Locator (URL) or other address directing a web browser to a particular server (such as server 762, or a server associated with a third-party system 770), and the web browser may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 760 may be a network-addressable computing system that can host an online social network. The social-networking system 760 may generate, store, receive, and send social-networking data, such as, for example, user-profile data, concept-profile data, social-graph information, or other suitable data related to the online social network. The social-networking system 760 may be accessed by the other components of network environment 700 either directly or via a network 710. As an example and not by way of limitation, a client system 730 may access the social-networking system 760 using a web browser of a third-party content 740, or a native application associated with the social-networking system 760 (e.g., a mobile social-networking application, a messaging application, another suitable application, or any combination thereof) either directly or via a network 710. In particular embodiments, the social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, the social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. The social-networking system 760 may provide users of the online social network the ability to communicate and interact with other users. In particular embodiments, users may join the online social network via the social-networking system 760 and then add connections (e.g., relationships) to a number of other users of the social-networking system 760 whom they want to be connected to. Herein, the term "friend" may refer to any other user of the social-networking system 760 with whom a user has formed a connection, association, or relationship via the social-networking system 760.

In particular embodiments, the social-networking system 760 may provide users with the ability to take actions on various types of items or objects, supported by the social-networking system 760. As an example and not by way of limitation, the items and objects may include groups or social networks to which users of the social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 760 or by an external system of a third-party system 760, which is separate from the social-networking system 760 and coupled to the social-networking system 760 via a network 710.

In particular embodiments, the social-networking system 760 may be capable of linking a variety of entities. As an example and not by way of limitation, the social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the social-networking system 760. In particular embodiments, however, the social-networking system 760 and third-party systems 770 may operate in conjunction with each other to provide social-networking services to users of the social-networking system 760 or third-party systems 770. In this sense, the social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 760 also includes user-generated content objects, which may enhance a user's interactions with the social-networking system 760. User-generated content may include anything a user can add, upload, send, or "post" to the social-networking system 760. As an example and not by way of limitation, a user communicates posts to the social-networking system 760 from a client system 730. Posts may include data such as status updates or other textual data, location information, photos, videos, links, music or other similar data or media. Content may also be added to the social-networking system 760 by a third-party through a "communication channel," such as a newsfeed or stream.

In particular embodiments, the social-networking system 760 may include a variety of servers, sub-systems, programs, modules, logs, and data stores. In particular embodiments, the social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 760 may also include suitable components such as network interfaces, security mechanisms, load balancers, failover servers, management-and-network-operations consoles, other suitable components, or any suitable combination thereof. In particular embodiments, the social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 760 to one or more client systems 730 or one or more third-party systems 770 via a network 710. The web server may include a mail server or other messaging functionality for receiving and routing messages between the social-networking system 760 and one or more client systems 730. An API-request server may allow a third-party system 770 to access information from the social-networking system 760 by calling one or more APIs. An action logger may be used to receive communications from a web server about a user's actions on or off the social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a request received from a client system 730. Authorization servers may be used to enforce one or more privacy settings of the users of the social-networking system 760. A privacy setting of a user determines how particular information associated with a user can be shared. The authorization server may allow users to opt in to or opt out of having their actions logged by the social-networking system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
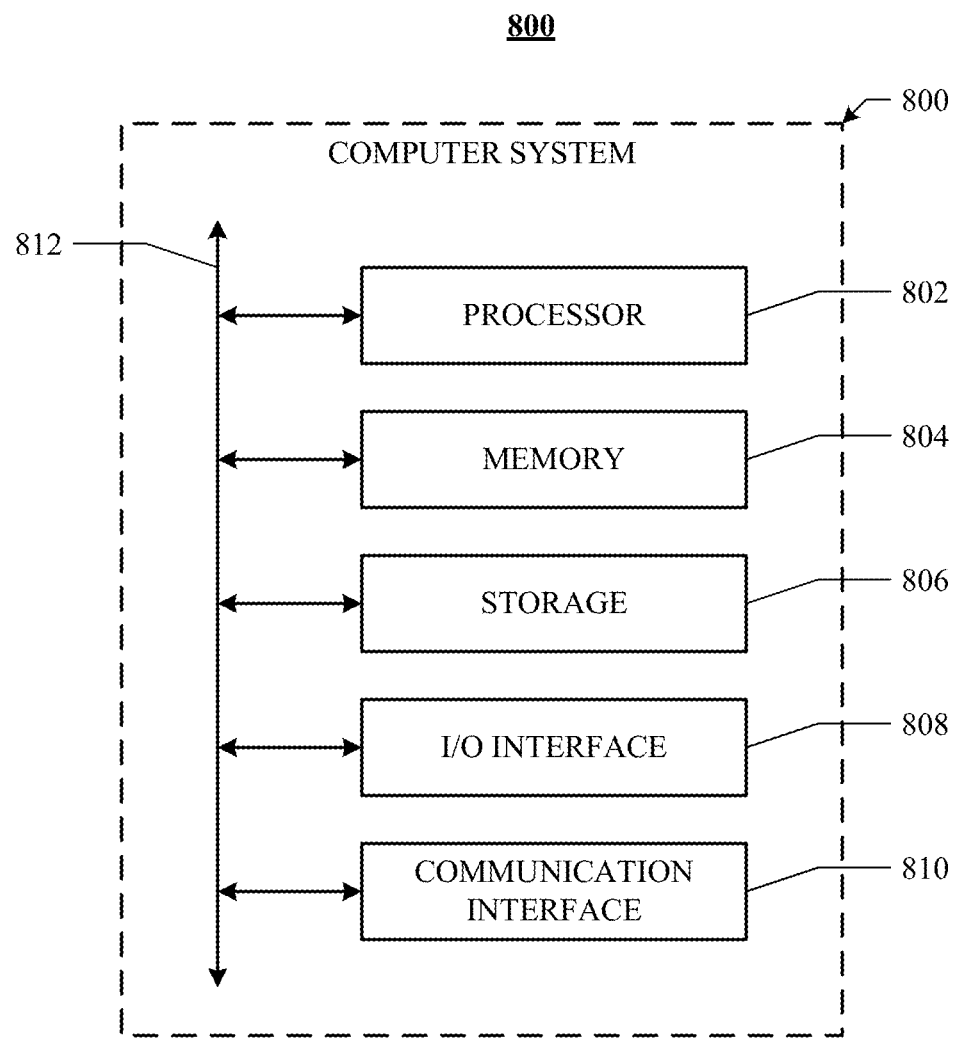
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing an image of a physical environment of a user, the image being associated with a perspective of the user and depicting a physical input device and a physical hand of the user;
   determining that a contrast between the physical input device and the physical hand depicted in the image is lower than a predetermined threshold;
   modifying the image to increase the contrast between the physical input device and the physical hand depicted in the image, thereby improving a visual distinction between a first set of pixels associated with the physical hand and a second set of pixels associated with the physical input device in the image;
   determining a pose of the physical input device;
   generating a three-dimensional model representing the physical hand of the user;
   generating an image mask by projecting the three-dimensional model onto an image plane associated with the perspective of the user;
   generating, by applying the image mask to the modified image, a cropped image depicting at least the physical hand of the user in the image;
   rendering, based on the perspective of the user and the pose of the physical input device, a virtual input device to represent the physical input device; and
   displaying the cropped image depicting at least the physical hand of the user over the rendered virtual input device.

2. The method of claim 1, wherein the image is generated by projecting image data captured from one or more second perspectives of one or more cameras of a head-mounted device onto the image plane associated with the perspective of the user, the one or more second perspectives of the one or more cameras being different from the perspective of the user.

3. The method of claim 2, wherein the image data captured by the one or more cameras is used to determine the pose of the physical input device and generate the three-dimensional model representing the physical hand of the user.

4. The method of claim 1, wherein the image mask comprises a buffer region surrounding a contour of a projection of the three-dimensional model on the image plane.

5. The method of claim 4, wherein at least the buffer region comprises alpha-blending values.

6. The method of claim 1, further comprising:
   determining that one or more points in the image depicting the physical hand are associated with a shadow of the physical hand; and
   modifying the image to exclude the one or more points associated with the shadow of the physical hand.

7. The method of claim 1, wherein the cropped image is displayed in response to a determination that the three-dimensional model representing the physical hand of the user is within a predefined bounding volume.

8. The method of claim 1, further comprising:
   rendering virtual labels for keys of the virtual input device; and
   displaying the virtual labels over both the cropped image depicting the physical hand of the user and the rendered virtual input device.

9. A system comprising: one or more processors; and a memory coupled to the processors comprising instructions executable by the processors, the processors operable when executing the instructions to:
   access an image of a physical environment of a user, the image being associated with a perspective of the user and depicting a physical input device and a physical hand of the user;
   determine that a contrast between the physical input device and the physical hand depicted in the image is lower than a predetermined threshold;
   modify the image to increase the contrast between the physical input device and the physical hand depicted in the image, thereby improving a visual distinction between a first set of pixels associated with the physical hand and a second set of pixels associated with the physical input device in the image;
   determine a pose of the physical input device;
   generate a three-dimensional model representing the physical hand of the user;
   generate an image mask by projecting the three-dimensional model onto an image plane associated with the perspective of the user;
   generate, by applying the image mask to the modified image, a cropped image depicting at least the physical hand of the user in the image;
   render, based on the perspective of the user and the pose of the physical input device, a virtual input device to represent the physical input device; and
   display the cropped image depicting at least the physical hand of the user over the rendered virtual input device.

10. The system of claim 9, wherein the image is generated by projecting image data captured from one or more second perspectives of one or more cameras of a head-mounted device onto the image plane associated with the perspective of the user, the one or more second perspectives of the one or more cameras being different from the perspective of the user.

11. The system of claim 10, wherein the image data captured by the one or more cameras is used to determine the pose of the physical input device and generate the three-dimensional model representing the physical hand of the user.

12. The system of claim 9, wherein the image mask comprises a buffer region surrounding a contour of a projection of the three-dimensional model on the image plane, and wherein at least the buffer region comprises alpha-blending values.

13. The system of claim 9, wherein the processors are further operable when executing the instructions to:
   determine that one or more points in the image depicting the physical hand are associated with a shadow of the physical hand; and
   modify the image to exclude the one or more points associated with the shadow of the physical hand.

14. The system of claim 9, wherein the cropped image is displayed in response to a determination that the three-dimensional model representing the physical hand of the user is within a predefined bounding volume.

15. One or more computer-readable non-transitory storage media embodying software that is operable when executed to:
   access an image of a physical environment of a user, the image being associated with a perspective of the user and depicting a physical input device and a physical hand of the user;
   determine that a contrast between the physical input device and the physical hand depicted in the image is lower than a predetermined threshold;
   modify the image to increase the contrast between the physical input device and the physical hand depicted in the image, thereby improving a visual distinction between a first set of pixels associated with the physical hand and a second set of pixels associated with the physical input device in the image;
   determine a pose of the physical input device;
   generate a three-dimensional model representing the physical hand of the user;
   generate an image mask by projecting the three-dimensional model onto an image plane associated with the perspective of the user;
   generate, by applying the image mask to the modified image, a cropped image depicting at least the physical hand of the user in the image;
   render, based on the perspective of the user and the pose of the physical input device, a virtual input device to represent the physical input device; and
   display the cropped image depicting at least the physical hand of the user over the rendered virtual input device.

16. The media of claim 15, wherein the image is generated by projecting image data captured from one or more second perspectives of one or more cameras of a head-mounted device onto the image plane associated with the perspective of the user, the one or more second perspectives of the one or more cameras being different from the perspective of the user.

17. The media of claim 16, wherein the image data captured by the one or more cameras is used to determine the pose of the physical input device and generate the three-dimensional model representing the physical hand of the user.

18. The media of claim 15, wherein the image mask comprises a buffer region surrounding a contour of a projection of the three-dimensional model on the image plane, and wherein at least the buffer region comprises alpha-blending values.

19. The media of claim 15, wherein the software is further operable when executed to:
   determine that one or more points in the image depicting the physical hand are associated with a shadow of the physical hand; and
   modify the image to exclude the one or more points associated with the shadow of the physical hand.

20. The media of claim 15, wherein the cropped image is displayed in response to a determination that the three-dimensional model representing the physical hand of the user is within a predefined bounding volume.

* * * * *